May 5, 1959
J. H. NELSON
2,885,529
METHOD OF AND APPARATUS FOR ELECTRIC FINISHING OF METAL ARTICLES
Filed Jan. 12, 1956
2 Sheets-Sheet 1
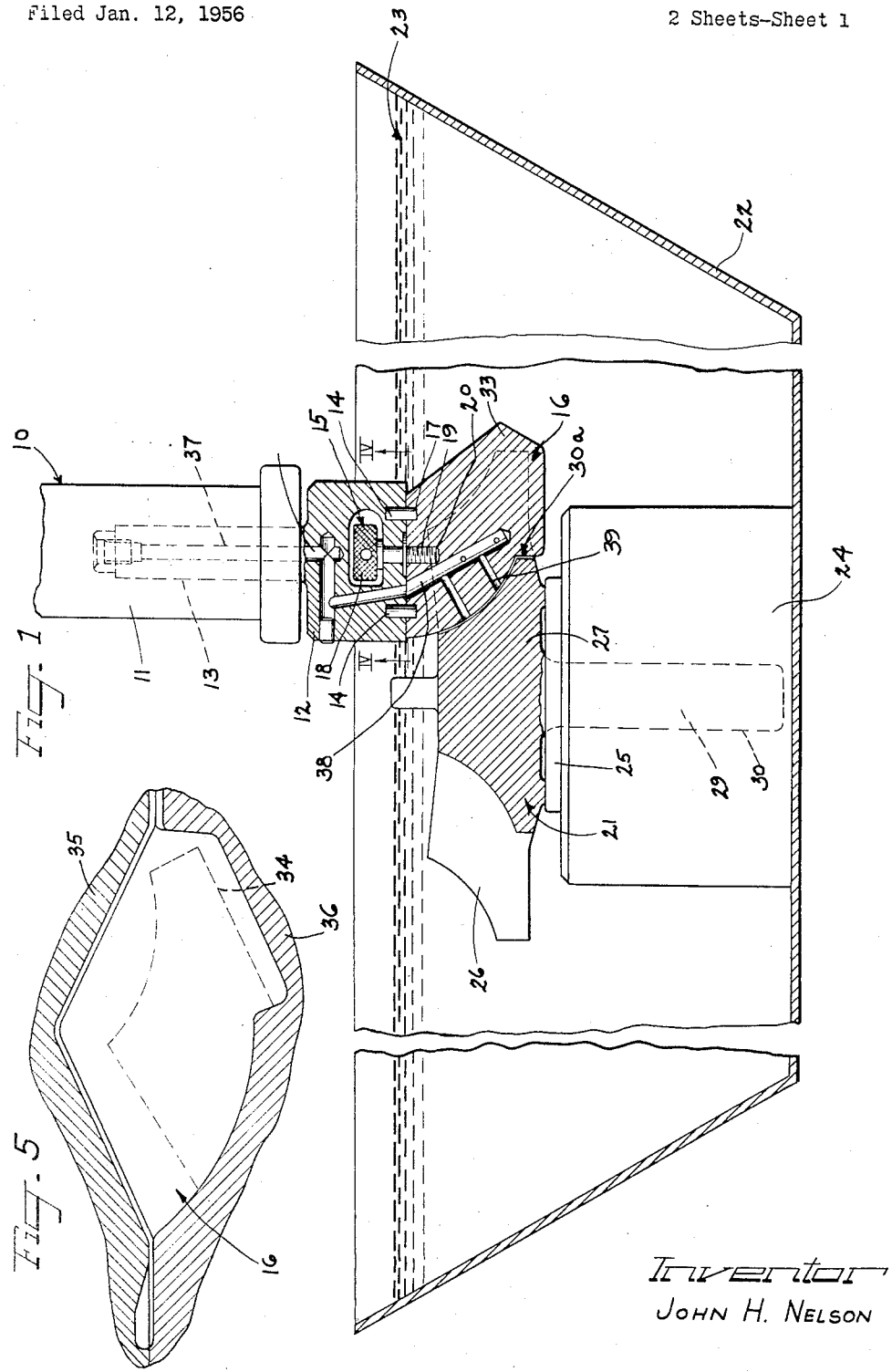
Inventor
JOHN H. NELSON May 5, 1959 J. H. NELSON 2,885,529
METHOD OF AND APPARATUS FOR ELECTRIC FINISHING OF METAL ARTICLES
Filed Jan. 12, 1956 2 Sheets-Sheet 2
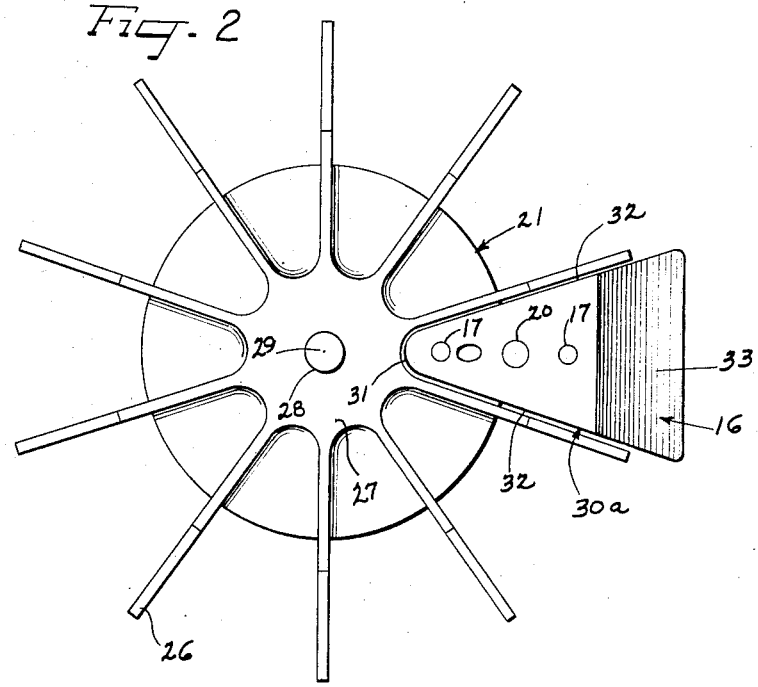
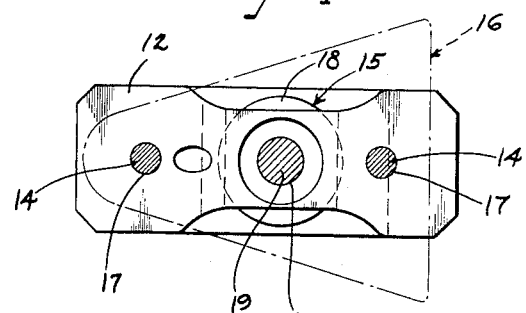
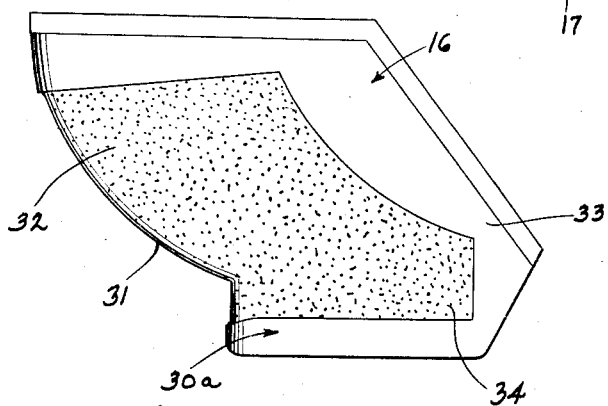
Inventor
JOHN H. NELSON United States Patent Office 2,885,529
Patented May 5, 1959

2,885,529

METHOD OF AND APPARATUS FOR ELECTRIC FINISHING OF METAL ARTICLES

John H. Nelson, Palos Park, Ill., assignor to Kropp Forge Company, Chicago, Ill., a corporation of Illinois Application January 12, 1956, Serial No. 558,685

14 Claims. (Cl. 219—69)

This invention relates generally to a new and improved method and apparatus for electrical discharge machining of an article.

More specifically, this invention relates to a new improved electrode construction which particularly lends itself to finish machining a turbine wheel or the like.

The electrode of the present invention lends itself to use in an electrical discharge machine, for example the machine used in the "Elox Process." In the operation of the instant machine, the electrode is lowered preferably into a dielectric fluid or oil bath in proximity to a work piece such as a turbine wheel which is sustained in the bath. An object of the invention is to finish machine vanes and hub of a forged or cast turbine wheel. This may be carried out by utilizing a sensitive adjusting mechanism which is capable of progressively urging the electrode a predetermined distance from the surface being machined. During the actuation of the electrode, the electrode is discharging (which may occur thousands of times per second). In other words, as voltage is built up between the electrode and work piece, the electrons are released at tremendous speeds to bombard the work piece surface. As the molecules on the surface of the work piece become heated as a result of bombardment, portions of same are vaporized. Acording to the theory, electrons strike atoms of the work piece to knock electrons from the orbit of the work piece atom and leave the work piece atom minus an electron or with a net positive charge. These positive portions or particles are attracted to the electrode having a negative charge and as they move across the minute gap between the work piece and the electrode they are cooled by coolant in the gap and are washed out to settle in the bottom of the oil tank.

It wil be appreciated that the cost of operation is proportional to the amount of wear occasioned to the electrode discharge surface during the machining process. Formerly electrodes had to be very accurately machined since the surface to be machined acquires the same configuration as the machining surface. The present invention concerns itself with a method and apparatus by which machining of the electrode is no longer necesary, rather, the electrode after becoming worn may be restruck to shape in a press or the like by reason that the electrode is purposely made oversize.

Accordingly, an object of this invention is to provide a new and improved electrode construction wherein the electrode is made oversize and the discharge surface upon becoming worn may be given its initial shape by restriking the oversize electrode.

Another object of this invention is to provide a new and improved electrode construction which lends itself to reducing the machining cost of metal articles.

A further object of this invention is to provide an improved method of electric discharge machining a metal article.

A still further object of this invention is to provide a new and improved electrode construction which particularly lends itself to finish machining a turbine wheel.

Yet another object of this invention is to provide a new and improved method of machining a turbine wheel.

According to the general features of this invention there is provided in a method of finish machining a turbine wheel including a central hub having radiating therefrom in circumferentially spaced relation a plurality of vanes whereby the wheel has at least one surface to be machined, the steps of providing an oversize electrode having an electron discharge surface of predetermined configuration corresponding to the configuration intended to be imparted to the surface to be machined, sustaining the surface to be machined in a fluid cooling bath, positioning the oversize electrode between the vanes in close adjacency to the hub in spaced relation to the wheel, directing power through the electrode discharge surface, bombarding the surface to be machined, machining same to specification, and restriking the oversize electrode after the discharge surface has become worn so that the discharge surface assumes generally its initial shape.

Still another feature of this invention relates to an electrode for use in the electronic finishing of an irregularly contoured surface of an article, a metallic shoe having a contoured face corresponding to the configuration intended to be imparted to the surface to be machined and including a back up portion positioned behind the face and which comprises material for replacing used up material on the face of the shoe upon a restriking of the face to assume its initial shape.

A further feature of this invention relates to utilizing an irregularly contoured oversize electrode to fine machine a rough irregularly contoured metal article.

Other objects and features of the present invention will more fully become apparent from the following detailed description taken in conjunction with the accompanying drawings illustrating a single embodiment thereof and in which:

Figure 1 is a side elevation with parts in cross section showing my novel electrode construction in readiness for machining portions of a turbine wheel;

Figure 2 is a plan view of a portion of the electrode in machining position with respect to the vanes and hub of a turbine wheel;

Figure 3 is a side elevation of an electrode after the same has been used in the machining of the turbine wheel in Figure 2;

Figure 4 is an enlarged cross sectional view taken substantially on the line IV—IV of Figure 1 looking in the direction indicated by the arrows; and Figure 5 is a diagrammatical view of press means to restrike the worn oversize electrode.

As shown on the drawings:

The reference numeral 10 (Figure 1) indicates generally a fragment or portion of an electric discharging machine which may suitably be of the type used in connection with the "Elox Process" which is now known in the art. The fragment 10 shown in the drawings includes a collet 11 capable of sustaining an electrode holder 12 including a holding stem 13 by a retaining action between the stem and collet as is well known.

The holder 12 has centering pins 14 and manually adjustable screw means 15 for carrying thereon an oversize preferably forged electrode 16 made of brass or other suitable material which embodies features of this invention.

As shown in Figure 1 it will be noted that pins 14 are engageable in sockets 17 in the electrode 16. Screw means 15 includes a handle 18 which is accessible from the exterior of the holder 12 having a vertical threaded shaft 19 engageable in a corresponding threaded bore 20 in the electrode 16. It is in this manner that fine adjustment of the electrode may be brought about with respect to a metal article to be finished, here being represented by a cast or forged turbine wheel 21.

As is known, the "Elox Process" is preferably carried out by immersing the article to be finished in a bath or tank 22 of dielectric coolant or oil 23. Sustained within the tank 22 is a bolster plate 24 having a back-up plate 25 upon which the wheel 21 is sustained. It will be noted that the instant turbine wheel 21 is of the type having a plurality of circumferentially spaced irregularly contoured relatively thin vanes 26 extending radially from a central irregularly contoured hub 27 which has a bore 28 (Figure 2) for receiving a shaft 29 which extends vertically into a bore 30 in the bolster plate 24 (Figure 1). From the foregoing it is apparent how the wheel is firmly maintained in the bath upon backup plate 25.

The instant mode of operation is carried out by moving the electrode into position between pairs of vanes 26 in close adjacency to the hub 27 in spaced relation to the wheel 21.

Present methods of casting and forging of a turbine wheel do not readily produce a fine finish on the wheel sufficient to statically and dynamically balance the wheel 21 to specification. The instant operation is intended to greatly facilitate the fine finishing of a turbine wheel 21.

It will be noted that the instant electrode construction has an irregular contoured surface 30a which is finely finished and has a surface dimension which is substantially identical to that intended to be imparted to the vane and hub surface. The surface 30a on electrode 16 includes an irregularly contoured nose portion or surface 31 and side surfaces or portions 32 for finishing the hub and vanes, respectively (Figure 2).

In addition to the foregoing, the oversize electrode, which may be made of brass, and has a back-up portion 33 supplying a material reserve so as to allow the electrode to be forged and restruck after becoming worn in the manner indicated at 34 in Figures 3 and 5.

This forging and restriking of the electrode 16 is shown diagrammatically in Figure 5 and includes upper and lower die members 35 and 36. It will be appreciated that a die slot or cavity has been provided for receiving the worn electrode 16 and is slightly smaller in configuration than the worn electrode 16. The reason for this is that after the electrode has been worn as indicated at 34, the reserve material or back-up portion 33 is utilized in reforming the irregular contoured face or surface in such a manner that it assumes generally its original precision configuration or shape. In restriking the worn electrode, it will be noted that cavities have been provided between the dies to receive any flash which may be subsequently removed.

In the finishing operation upon the irregularly contoured vane and hub surfaces, the electrode is initially brought into close spaced relation to the wheel 21. Thereafter, power is switched on in the machine causing a build up of electrons on electrode discharge surfaces 31 and 32 until the stress becomes so high that they crash through the surface barrier and speed toward the corresponding surfaces on the vanes and hub wheel. These electrons are believed to travel at nearly the speed of light. It will be appreciated, that a single discharge initially is composed of billions of moving electrons. This discharge always occurs between the closest points of the electrode and turbine wheel. The voltage at which the discharge occurs is controlled by the space in between the electrode and the work-piece and is extremely repetitive if the spacing is accurately held. As the electrons strike the surface of the turbine wheel they agitate the surface molecules by bombarding same. In so doing the irregularly contoured peripheral turbine surface of the vanes and hub becomes heated to such an extent that portions of same become vaporized.

According to theory, electrons strike atoms of the surface and knock electrons from the orbit of the surface atoms and leave the surface atom minus an electron or with a net positive charge. In view of this, it will be appreciated that a tiny portion of the surface is turned into superheated metallic vapor with a positive charge. Since it is well known that unlike charges attract each other and since the electrode has a minus charge, the freed portions move away from the wheel surface into the gap between the electron and the wheel toward the electron and are prevented from reaching the electrode as a consequence of being immersed in the coolant bath and additionally by the direction of fluid directly onto the wheel surface.

In other words, as the portions or particles move away from the wheel surface they are cooled by the coolant before they reach the electrode and are washed out of the gap and settle out in the bottom of the bath due to the low viscosity of the coolant.

During the foregoing operation the electrode may be constantly moved in closer and closer proximity to the surface being machined until the surface being machined is machined to a predetermined extent. This is accomplished through the use of a feed control mechanism on the machine 10 of the type which is now well known in the art.

In the machining operation it will be appreciated that the electrode becomes worn as indicated at 34 on the electrode 16 shown in Figure 3. Hence as the vanes and hubs are machined at various intervals about the turbine wheel 11, the electrode becomes continually further worn until it is not as accurate as desired.

The instant electrode construction 11 in view of its being made oversize may be then inserted into the previously described press and forged and restruck to size until the discharge surfaces 31 and 32 assume their initial or beginning shapes. It will be appreciated that such a manner of operation greatly reduces costs and allows the electrode to be used over and over.

Suitable apparatus may be employed with the machine 10 to pump coolant through passageways 37 in the holding stem 13 and the holder 12 which are in communication with a central passageway 38 in the electrode 16 having various smaller passageways 39 in communication with the exterior surfaces 31 and 32 of the electrode. By so doing, the detached machined particles may be more rapidly cooled thereby insuring that the metallurgical characteristics of the turbine wheel will remain unimpaired.

It will be understood that modifications and variations may be effected without departing from the scope of the novel concepts of the present invention.

I claim as my invention:

1. In a method of electrical discharge machining a surface on a metal article to predetermined configuration, the steps of providing an oversize electrode having a discharge surface of predetermined configuration substantially the same configuration as the intended predetermined configuration to be imparted to the surface to be machined, providing fluid passageways in the electrode in communication with the discharge surface to permit cooling liquid to be directed against the surface to be machined, and after machining the metal article and upon wearing of the electrode discharge surface, restriking the oversize electrode so that the discharge surface assumes its initial shape.

2. In a method of finish machining a turbine wheel including a central hub having radiating therefrom in circumferentially spaced relation a plurality of radially extending vanes, the steps of providing an oversize electrode having an electron discharge surface of predetermined configuration, supporting the metal article in a fluid cooling bath, advancing the oversize electrode between the vanes in close adjacency to the hub in spaced relation to the wheel, directing power through the electron discharging surface bombarding an adjacent surface of the hub and vanes machining same to specification and upon eroding and wearing of the electrode discharge surface restriking the electrode discharge surface in a manner causing the metal of the oversized electrode to be displaced with the electrical discharge surface being thereby reformed to generally its initial shape.

3. In a method of finish machining a turbine wheel including a central hub having radiating therefrom in circumferentially spaced relation a plurality of vanes whereby the wheel has at least one surface to be machined, the steps of providing an oversize electrode having an electron discharge surface of predetermined configuration corresponding to the configuration intended to be imparted to the surface to be machined, sustaining the surface to be machined in a fluid cooling bath, positioning the oversize electrode between the vanes in close adjacency to the hub in spaced relation to the wheel, directing power through the electrode discharge surface bombarding the surface to be machined, machining same to specification, and restriking the oversize electrode after the discharge surface has become worn so that the discharge surface assumes generally its initial shape.

4. In a method of finish machining a turbine wheel including a central hub having radiating therefrom in circumferentially spaced relation a plurality of vanes whereby the wheel has at least one surface to be machined, the steps of providing an oversize electrode having an electron discharge surface of predetermined configuration corresponding to the configuration intended to be imparted to the surface to be machined, providing fluid passageways in the electrode in communication with the discharge surface to permit cooling liquid to be projected directly against the surface to be machined, sustaining the surface to be machined in a fluid cooling bath, positioning the oversize electrode between the vanes in close adjacency to the hub in spaced relation to the wheel, directing power through the electrode discharge surface bombarding the surface to be machined, machining same to specification, and restriking the oversize electrode after the discharge surface has become worn so that the discharge surface assumes generally its initial shape.

5. In an electrode for use in the electronic finishing of an irregularly contoured surface of an article, a metallic shoe having a contoured face corresponding to the configuration intended to be imparted to the surface to be finished and including a back up portion positioned behind the face and which comprises material for replacing used up material on said face of the shoe upon a restriking of the face to assume its initial shape, and flat edges behind said back up portion to facilitate restriking of the face.

6. In an electrode for use in the electronic finishing of an irregularly contoured surface of an article, a metallic shoe having a contoured face corresponding to the configuration intended to be imparted to the surface to be finished and including a back up portion positioned behind the face and which comprises material for replacing used up material on said face of the shoe upon a restriking of the face to assume its initial shape, and flat edges behind said back up portion to facilitate restriking of the face, said shoe having at least one passageway in communication with said face to assist in cooling during the electronic finishing of said article.

7. In a device for use in the electronic finishing of a turbine wheel having a hub provided with circumferentially spaced generally radially extending vanes including an electrode having a generally U-shaped discharge surface corresponding to the configuration intended to be imparted to the surface to be finished, said electrode being oversized having a substantial back-up portion positioned behind said U-shaped discharge surface and which comprises material for replacing used up material on said surface after said surface has become worn upon a restriking of the electrode thereby imparting to the discharge surface its initial shape.

8. In a device for use in the electronic finishing of a turbine wheel having a hub provided with circumferentially spaced generally radially extending vanes including an electrode having a generally U-shaped discharge surface corresponding to the configuration intended to be imparted to the surface to be finished, said electrode being oversized having a substantial back-up portion positioned behind said U-shaped discharge surface and which comprises material for replacing used up material on said surface after said surface has become worn upon a restriking of the electrode thereby imparting to the discharge surface its initial shape, said electrode having at least one passageway in communication with said surface to assist in cooling during the electronic finishing of said turbine wheel.

9. In a device for use in the electronic finishing of a turbine wheel having a hub provided with circumferentially spaced generally radially extending vanes including an electrode having a generally U-shaped discharge surface corresponding to the configuration intended to be imparted to the surface to be finished, said electrode being oversized having a substantially back-up portion positioned behind said U-shaped discharge surface and which comprises material for replacing used up material on said surface after said surface has become worn upon a restriking of the electrode thereby imparting to the discharge surface its initial shape, and an edge area spaced behind the U-shaped discharge surface to facilitate restriking of the U-shaped discharge surface.

10. In a method of finish machining a dished article whereby the dished article has at least one dished surface to be machined, the steps of providing an oversize electrode having an electron discharge surface of predetermined configuration corresponding to the configuration intended to be imparted to the dished surface to be machined, sustaining the dished surface to be machined in a fluid cooling bath, positioning the oversize electrode in close adjacency to the dished article in spaced relation to the dished surface to be machined, directing power through the electrode discharge surface bombarding the surface to be machined, machining same to specification, and restriking the oversize electrode after the discharge surface has become worn so that the discharge surface assumes generally its initial shape.

11. In a method of finish machining a turbine wheel including a central hub having radiating therefrom in circumferentially spaced relation a plurality of vanes whereby the wheel has at least one surface to be machined, the steps of providing an oversize electrode having an electron discharge surface of predetermined configuration corresponding to the configuration intended to be imparted to the surface to be machined, positioning the oversize electrode between the vanes in close adjacency to the hub in spaced relation to the wheel, directing power through the electrode discharge surface bombarding the surface to be machined, liquid cooling the electrode discharge surface and the surface being machined, machining same to specification, and restriking the oversize electrode after the discharge surface has become worn so that the discharge surface assumes generally its initial shape.

12. In a method of finish machining a turbine wheel including a central hub having radiating therefrom in circumferentially spaced relation a plurality of vanes whereby the wheel has at least one surface to be machined, the steps of providing an oversize electrode having an electron discharge surface of perdetermined configuration corresponding to the configuration intended to be imparted to the surface to be machined, positioning the oversize electrode between the vanes in close adjacency to the hub in spaced relation to the wheel, directing power through the electrode discharge surface bombarding the surface to be machined, liquid cooling the electrode discharge surface and the surface being machined, machining same to specification, restriking the oversize electrode after the discharge surface has become worn so that the discharge surface assumes generally its initial shape, and trimming the flash from the restruck oversize electrode.

13. In an apparatus for electrical discharge machining a turbine wheel having a series of peripherally spaced vanes projecting from a hub area, a tub having a liquid coolant therein, means mounted in the tub upon which the turbine wheel is mountable, an electrode having an electrical discharge surface disposed between the vanes in cloosely spaced proximity to the surface to be machined and corresponding to the shape intended to be imparted to the wheel surface to be machined, said electrode having a back-up portion disposed behind the electrical discharge surface between the vanes which comprises material for replacing eroded areas on the discharge surface after wear and upon the electrode being restruck, and means sustaining the electrical discharge surface over the tub and in the liquid coolant in closely spaced proximity to the surface to be machined.

14. In apparatus for finish machining a turbine wheel including a central hub having radiating therefrom in circumferentially spaced relation a plurality of vanes, an oversize electrode having an electron discharge surface area of predetermined configuration corresponding to the configuration to be imparted to a confronting vane surface to be machined, means providing a fluid cooling bath and for supporting the blade surface to be machined in the cooling bath, and means for positioning the oversize electrode between a pair of the vanes with said discharge surface area in close adjacency to the confronting vane surface to be machined but in spaced relation thereto for bombarding said confronting vane surface to be machined until said confronting surface has been machined to specification, said electrode having sufficient material thereon to facilitate restriking of the electrode and thereby returning said discharge surface area to said predetermined configuration after it becomes worn as a result of machining bombardment.

References Cited in the file of this patent

UNITED STATES PATENTS

| | | |
|---|---|---|
| 2,250,645 | Meadowcroft et al. | July 29, 1941 |
| 2,490,302 | Holfelder | Dec. 6, 1949 |
| 2,501,954 | McKechnie et al. | Mar. 28, 1950 |
| 2,650,979 | Teubner | Sept. 1, 1953 |